(12) United States Patent
Ma et al.

(10) Patent No.: US 8,371,870 B2
(45) Date of Patent: Feb. 12, 2013

(54) MOUSE DEVICE WITH A SEPARABLE TRANSMISSION CABLE

(75) Inventors: Mou-Ming Ma, Taipei (TW); Shu-I Cheh, Taipei (TW)

(73) Assignee: Giga-Byte Technology Co., Ltd., Taipei Hsien (TW)

( * ) Notice: Subject to any disclaimer, the term of this patent is extended or adjusted under 35 U.S.C. 154(b) by 423 days.

(21) Appl. No.: 12/795,074

(22) Filed: Jun. 7, 2010

(65) Prior Publication Data

US 2011/0298712 A1 Dec. 8, 2011

(51) Int. Cl.
*H01R 13/625* (2006.01)
(52) U.S. Cl. .......................... 439/347; 345/163; 439/354
(58) Field of Classification Search .................. 439/131, 439/142, 135, 136, 345, 347, 354; 345/163
See application file for complete search history.

(56) References Cited

U.S. PATENT DOCUMENTS

| | | | | |
|---|---|---|---|---|
| 5,615,250 A * | 3/1997 | Kobayashi | .................... | 455/558 |
| 5,716,730 A * | 2/1998 | Deguchi | ........................ | 429/97 |
| 5,803,762 A * | 9/1998 | Green | .......................... | 439/347 |
| 5,930,424 A * | 7/1999 | Heimberger et al. | ........... | 385/53 |
| 6,402,565 B1 * | 6/2002 | Pooley et al. | .................. | 439/680 |
| 6,943,527 B2 * | 9/2005 | Liu et al. | ....................... | 320/107 |
| 7,119,791 B2 * | 10/2006 | Iwasaki | ......................... | 345/163 |
| 7,887,942 B2 * | 2/2011 | Rejman et al. | .................. | 429/97 |
| 2006/0007151 A1 * | 1/2006 | Ram | ............................ | 345/163 |
| 2007/0132733 A1 * | 6/2007 | Ram | ............................ | 345/163 |
| 2010/0228405 A1 * | 9/2010 | Morgal et al. | ..................... | 701/2 |
| 2010/0265179 A1 * | 10/2010 | Ram | ............................ | 345/163 |

* cited by examiner

*Primary Examiner* — Neil Abrams
*Assistant Examiner* — Phuongchi Nguyen
(74) *Attorney, Agent, or Firm* — Muncy, Geissler, Olds & Lowe, PLLC (57) ABSTRACT

A mouse device with a separable transmission cable includes a mouse body, a transmission cable and a buckling means. The mouse body further has a buckling jack and a body connection port located close to the buckling jack. The transmission cable further includes a first terminal and a second terminal, in which the first terminal has a first connection port for engaging the body connection port and the second terminal has a second connection port for engaging a computer. The buckling means for buckling the first terminal inside the buckling jack of the mouse body is located at the first connection port.

4 Claims, 7 Drawing Sheets

MOUSE DEVICE WITH A SEPARABLE TRANSMISSION CABLE

BACKGROUND OF THE INVENTION (1) Field of the Invention

This present invention relates to a point-indexing device, more particularly to a mouse device with a separable transmission cable.

(2) Description of the Prior Art

In the art of computer science, the most important human-machine interfaces include definitely the mouse and the keyboard. Conventionally, a transmission cable is used to establish the communication between the mouse and the computer. However, to a busy computer system, more than two transmission cables are usually adapted at the same time to connect with the peripherals of the computer system. Under such a circumstance, it is easy to expect a terrible desk top space. Especially, in the case that an improper installation location happens to the computer, the problem of a too-short or too-long cable is usually found this busy computer. Even more, problems including ill-tension in some cables, loosen peripherals, unexpected fall-to-floor damages become inevitable.

Accordingly, emerge of the wireless communication technique to the desk-top system provides some answers. A clear advantage of the wireless communication is to reduce the number of the transmission cables. Yet, some other new disadvantages may also rise while introducing the wireless communication between the computer and its various peripherals. One of those disadvantages is the peripheral (the mouse for example) needs to have a built-in power source (the battery for example). For the transmission between the wireless peripheral and the computer is usually busy, it can be foreseen that the replacement or recharge of the battery might be quite frequent. Further, to the user in computer drawing or in some specific professionals, current wireless communication technique cannot provide sufficient transmission capacity to meet their needs.

In the following discussion of the present invention, the mouse is introduced to represent the typical peripheral of the computer system.

SUMMARY OF THE INVENTION

Accordingly, it is the primary object of the present invention to provide a mouse device with a separable transmission cable, which the cable jumper can be any one of extension cables with various length specs.

In the present invention, the mouse device with a separable transmission cable includes a mouse body, a transmission cable and a buckling means. The mouse body has a buckling jack and a body connection port built-in close to the buckling jack. The transmission cable has a first terminal and a second terminal. The first terminal further includes a first connection port to connect electrically with the body connection port, while the first terminal engages the buckling jack. The second terminal further includes a second connection port to connect electrically with a computer. The buckling means for buckling the first terminal inside the buckling jack of the mouse body is located at the first terminal of the transmission cable.

In one embodiment of the present invention, the mouse body further has a cover protrusion located at an opening of the buckling jack, by which the cover protrusion can shield the buckling jack while the transmission cable is disconnected from the mouse body.

In one embodiment of the present invention, the first terminal has an internal accommodation space, and the first connection port is located at one side of the accommodation space. The first terminal further has a first opening at another side of the accommodation space, and a second opening at a further side of the accommodation space. The buckling means includes a stop rod, a push rod and two spring elements. The stop rod has a stop end penetrating through the first opening, and a first taper end located opposing to the stop end. One of the two spring elements sleeves the stop rod inside the accommodation space. The push rod has a second taper end to contact with the first taper end of the stop rod, and a push end penetrating the second opening. The other spring element sleeves the push rod inside the accommodation space.

In one embodiment of the present invention, the buckling means includes a connection part, a stop part and a depression part. The connection part is to connect with the first terminal. The stop part is protruded laterally from the connection part in a manner of toward the second terminal. The depression part is protruded from a rear of the stop part in a manner of toward the second terminal. In the case that the first terminal is buckled inside the buckling jack of the mouse body, the stop part is contacted against an inner wall of the buckling jack, and the depression part is located outside the mouse body.

In one embodiment of the present invention, the first terminal has an internal accommodation space and the first connection port is located at one side of the accommodation space. The first terminal further has a first opening located at another side of the accommodation space opposing to the first connection port. The buckling means includes a stop rod and a spring element. The stop rod located mainly inside the accommodation space has a stop end penetrating through the first opening. The spring element sleeves the stop rod inside the accommodation space. The mouse body further includes a buckling hole located close to a bottom plate of the accommodation space. In the case that the first terminal is buckled inside the buckling jack, the stop end of the stop rod is plugged inside the buckling hole of the bottom plate.

By providing the buckling means to the separable transmission cable with any standard extension length in accordance with the present invention, the application distance of the mouse device to the computer can be varied arbitrarily. Upon such an arrangement, precision operations of the mouse device can be ensured, and the aforesaid problems caused by the wireless or wire transmission can be successfully overcome. It is another object of the present invention to provide an earphone that can ensure the separable connection between the earphone body and the cable by providing a first buckle structure to the earphone body.

In the present invention, the earphone includes an earphone body that can receive, in a separable manner, one of plural audio cables with different lengths. Each of the audio cables has an individual audio terminal. The earphone further includes a first buckle structure to ensure the separable connection between the audio jack of the earphone body and the audio terminal of a respective audio cable. Preferably, the first buckle structure can be located at the audio jack.

By providing the separable connection between the earphone body of the earphone and one of the audio cables with various application lengths in accordance with the present invention, the earphone can then be applicable conveniently to various application environments of the audio source device without the aforesaid problems described in the background section.

All these objects are achieved by the mouse device with a separable transmission cable described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to a mouse device with a separable transmission cable. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Figure 1:
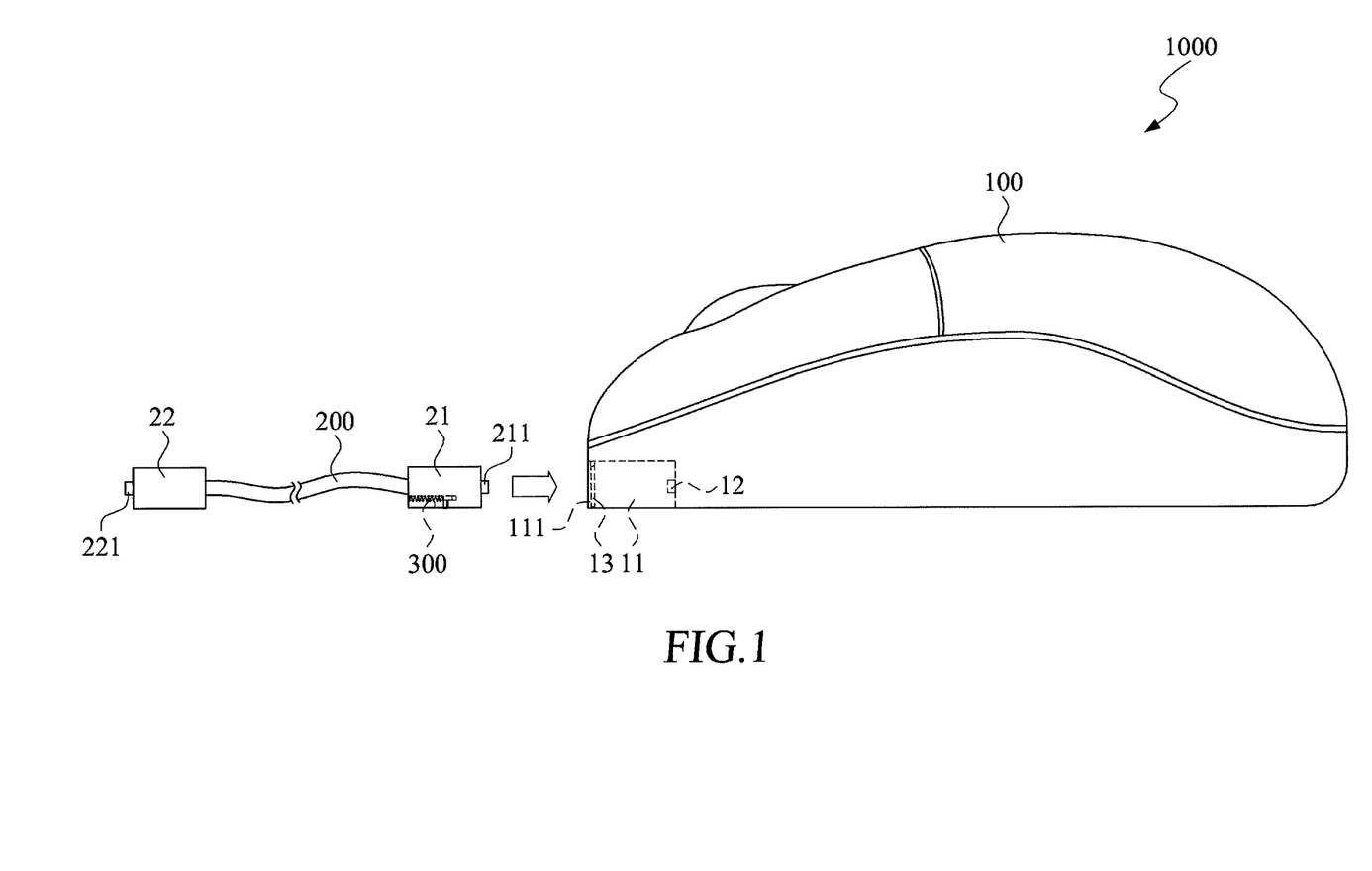
FIG. 1 shows a first embodiment of the mouse device in accordance with the present invention.
Figure 2:
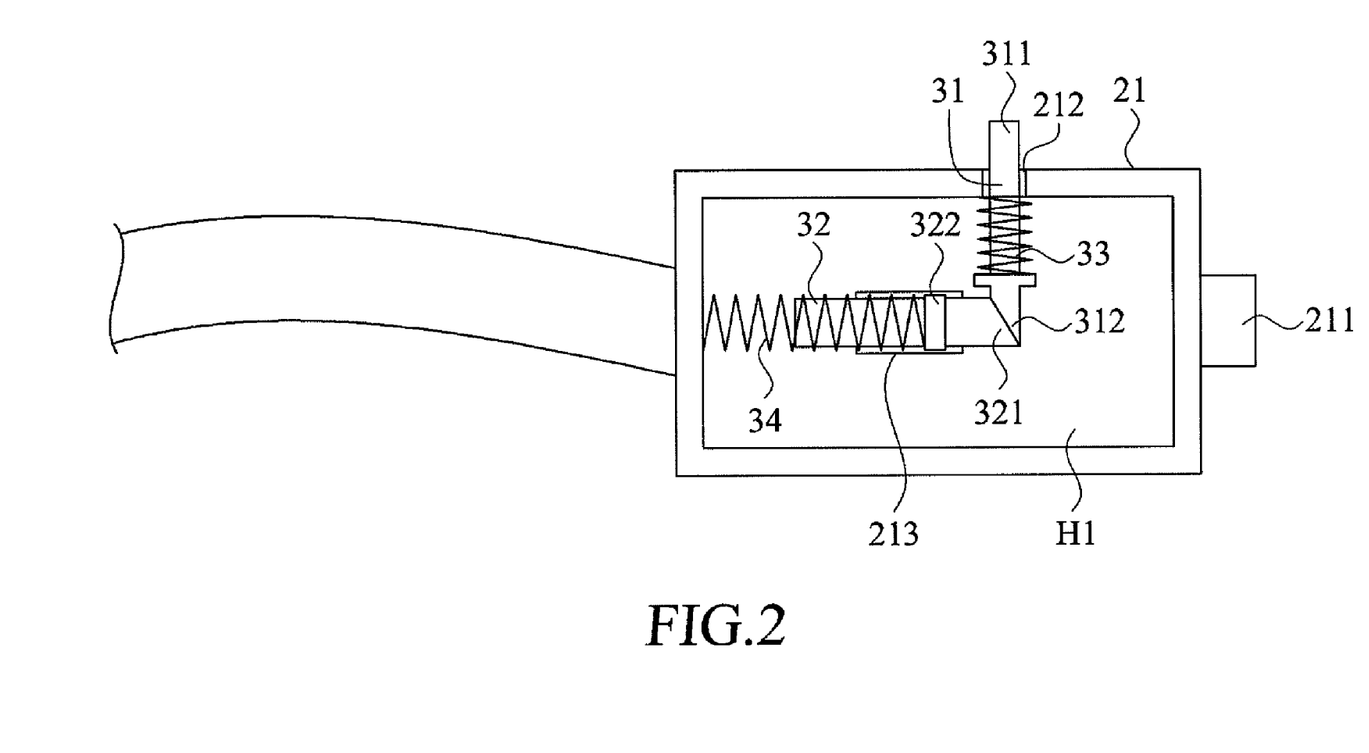
FIG. 2 shows a top view of the buckling means of FIG. 1.
Figure 3:
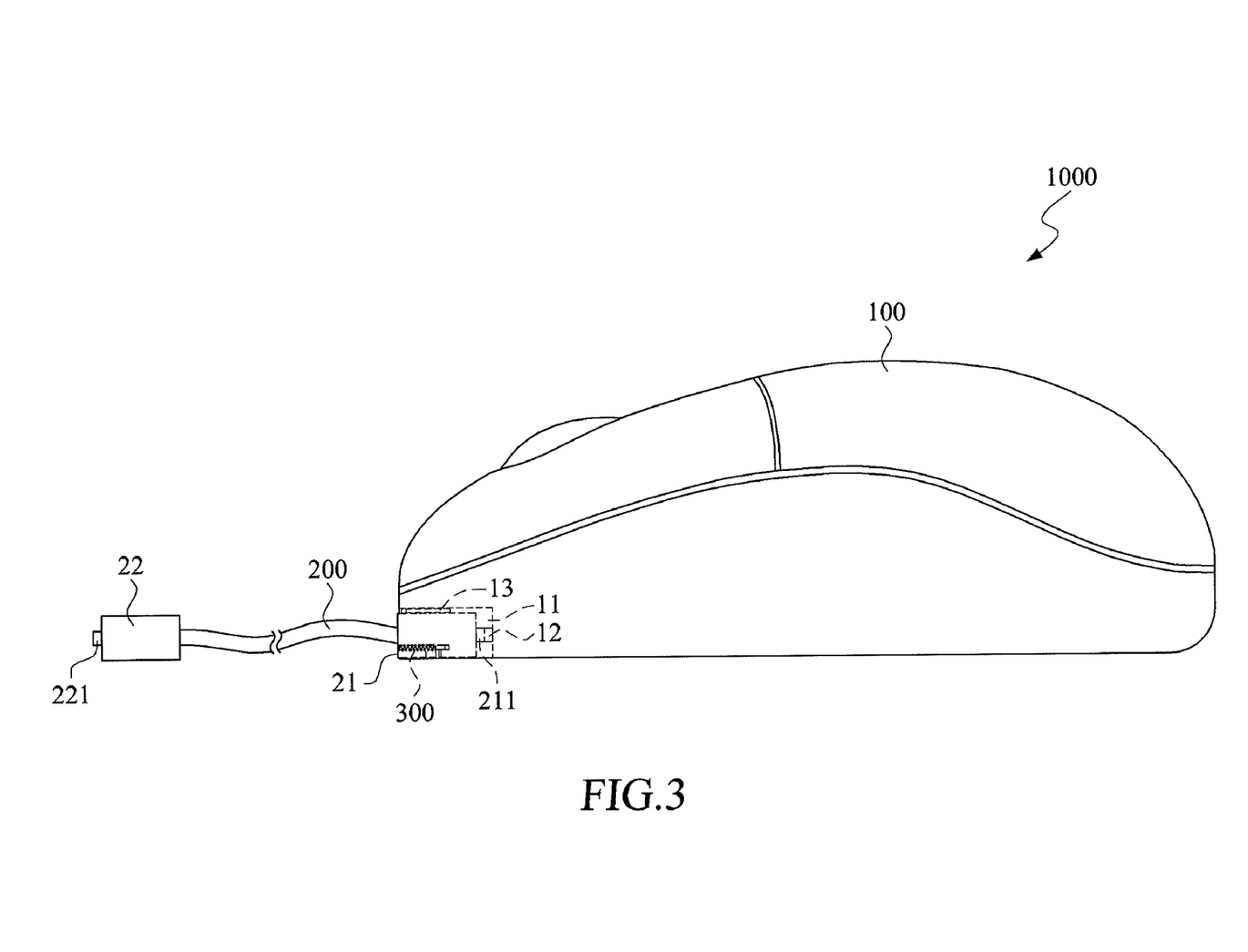
FIG. 3 shows a schematic view of an engagement state between the mouse body and the separable transmission cable of FIG. 1.

Refer to FIG. 1, FIG. 2 and FIG. 3; where FIG. 1 is a first embodiment of the mouse device in accordance with the present invention, FIG. 2 is a top view of the buckling means of the first embodiment, and FIG. 3 is a schematic view showing an engagement state of the mouse body and the separable transmission cable of FIG. 1.

As shown, the mouse device 1000 with a separable transmission cable includes a mouse body 100, a transmission cable 200 and a buckling means 300. The mouse body 100 further has a buckling jack 11. The buckling jack 11 includes at least an opening 111. The mouse body 100 further has a body connection port 12 located close to the buckling means 11.

The transmission cable 200 has a first terminal 21 and a second terminal 22. The first terminal 21 further includes a first connection port 211 to connect electrically with the body connection port 12, while the first terminal 21 engages the buckling jack 11. The second terminal 22 further includes a second connection port 221 to connect electrically with a computer (not shown in the figures).

The buckling means 300 for buckling the first terminal 21 inside the buckling jack 11 of the mouse body 100 is located at the first terminal 21 of the transmission cable 200. Preferably, the mouse body 100 further has a cover protrusion 13 located at an opening 111 of the buckling jack 11, by which the cover protrusion 13 can shield the buckling jack 11 while the transmission cable 200 is disconnected from the mouse body 100. On the other hand, in the case that the transmission cable 200 is plugged into the buckling jack 11 of the mouse body 100, the cover protrusion 13 can be properly unfolded into the buckling jack 11 or the mouse body 100.

In the present invention, embodying of the buckling means 300 doesn't limit to any specific type of buckles. The embodiment of the buckling means 300 raised herein is just a typical example to better demonstrate the design logics of the buckling means.

In the first embodiment as shown from FIG. 1 to FIG. 3, the first terminal 21 has an internal accommodation space H1, and the first connection port 211 is located at one side of the accommodation space H1. The first terminal 21 further has a first opening 212 at another side of the accommodation space H1, and a second opening 213 at a further side of the accommodation space H1.

The buckling means 300 includes a stop rod 31, a push rod 32 and two spring elements 33, 34. The stop rod 31 has a stop end 311 penetrating through the first opening 212, and a first taper end 312 located opposing to the stop end 311. The spring element 33 sleeves the stop rod 31 inside the accommodation space H1. The push rod 32 has a second taper end 321 to contact with the first taper end 312 of the stop rod 31, and a push end 322 penetrating the second opening 213. The other spring element 34 sleeves the push rod 32 inside the accommodation space H1.

By providing the aforesaid buckling means 300, both engagement and disengagement of the mouse body 100 and the transmission cable 200 can be conveniently initiated by pushing the push end 322 of the push rod 32 to drive inward the stop end 311 into the accommodation space H1.

Figure 4:
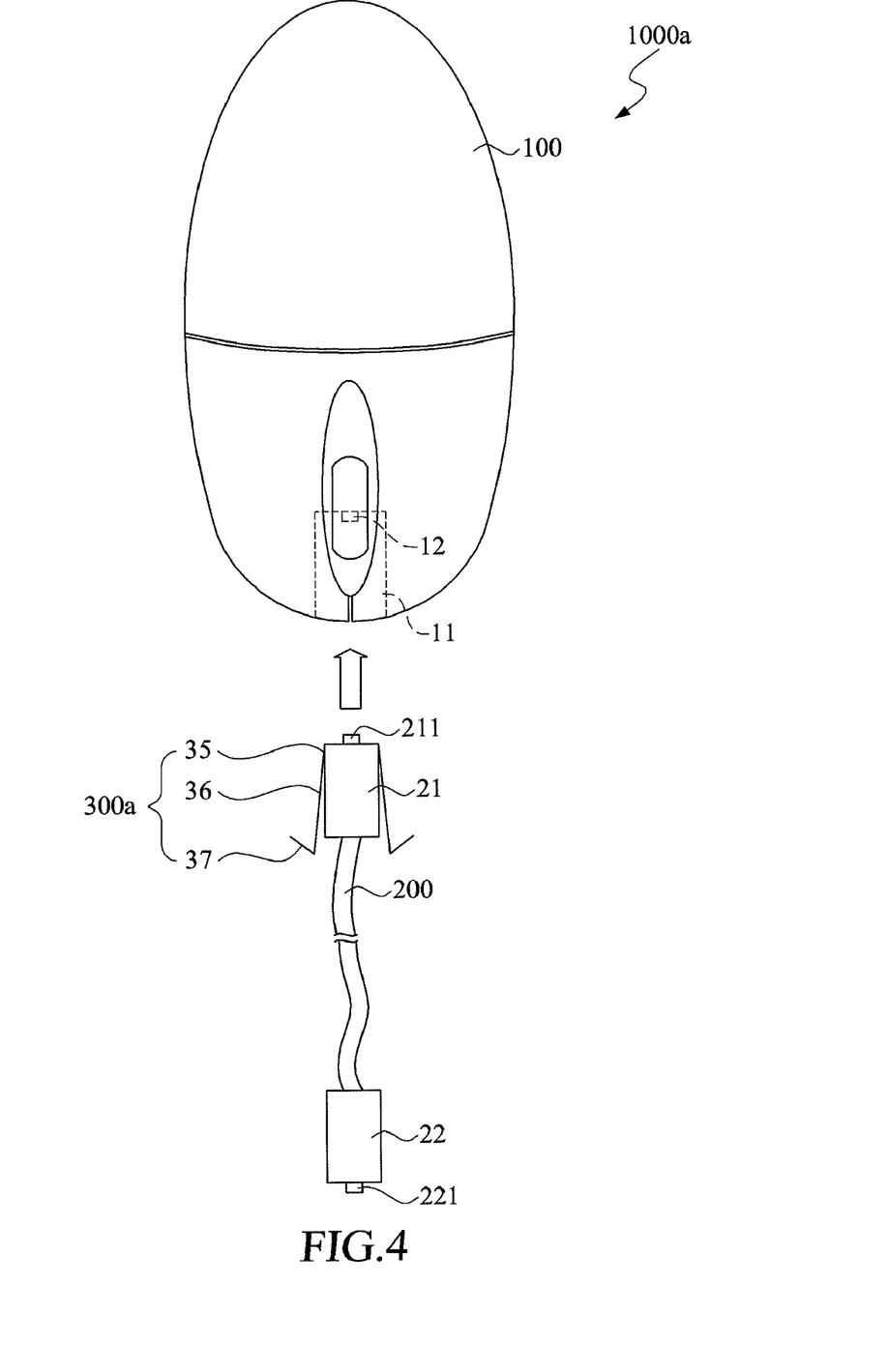
FIG. 4 shows an engagement state of a second embodiment of the mouse device in accordance with the present invention.
Figure 5:
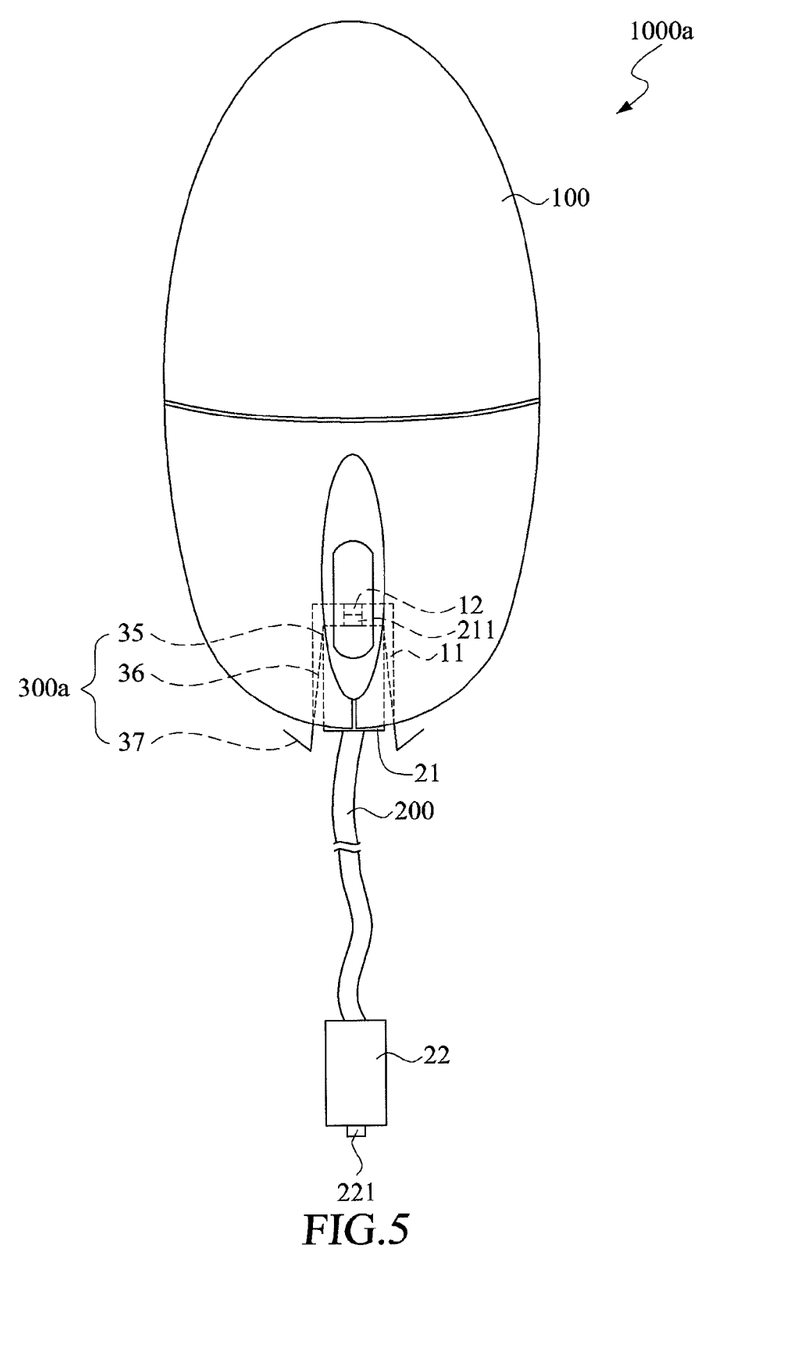
FIG. 5 shows a separate state of FIG. 4.

Referring now to FIG. 4 and FIG. 5, an engagement state and a separate state of a second embodiment of the mouse device in accordance with the present invention are shown, respectively. In this embodiment 1000a, the buckling means 300a includes a connection part 35, a stop part 36 and a depression part 37. The connection part 35 is to connect with the first terminal 21. The stop part 36 is protruded laterally from the connection part 35 in a manner of toward the second terminal 22. The depression part 37 is protruded from a rear of the stop part 36 in a manner of toward the second terminal 22. In the case that the first terminal 21 is buckled inside the buckling jack 11 of the mouse body 100, the stop part 36 is contacted against an inner wall of the buckling jack 11, and the depression part 37 is exposed to the mouse body 100. Upon such an arrangement, while in disengaging the transmission cable 200 from the mouse body 100, the stop part 36 can be separated from the inner wall of the buckling jack 11 by depressing the depression part 37. Then, the transmission cable 200 can be easily pulled off the buckling jack 11 of the mouse body 100.

Figure 6:
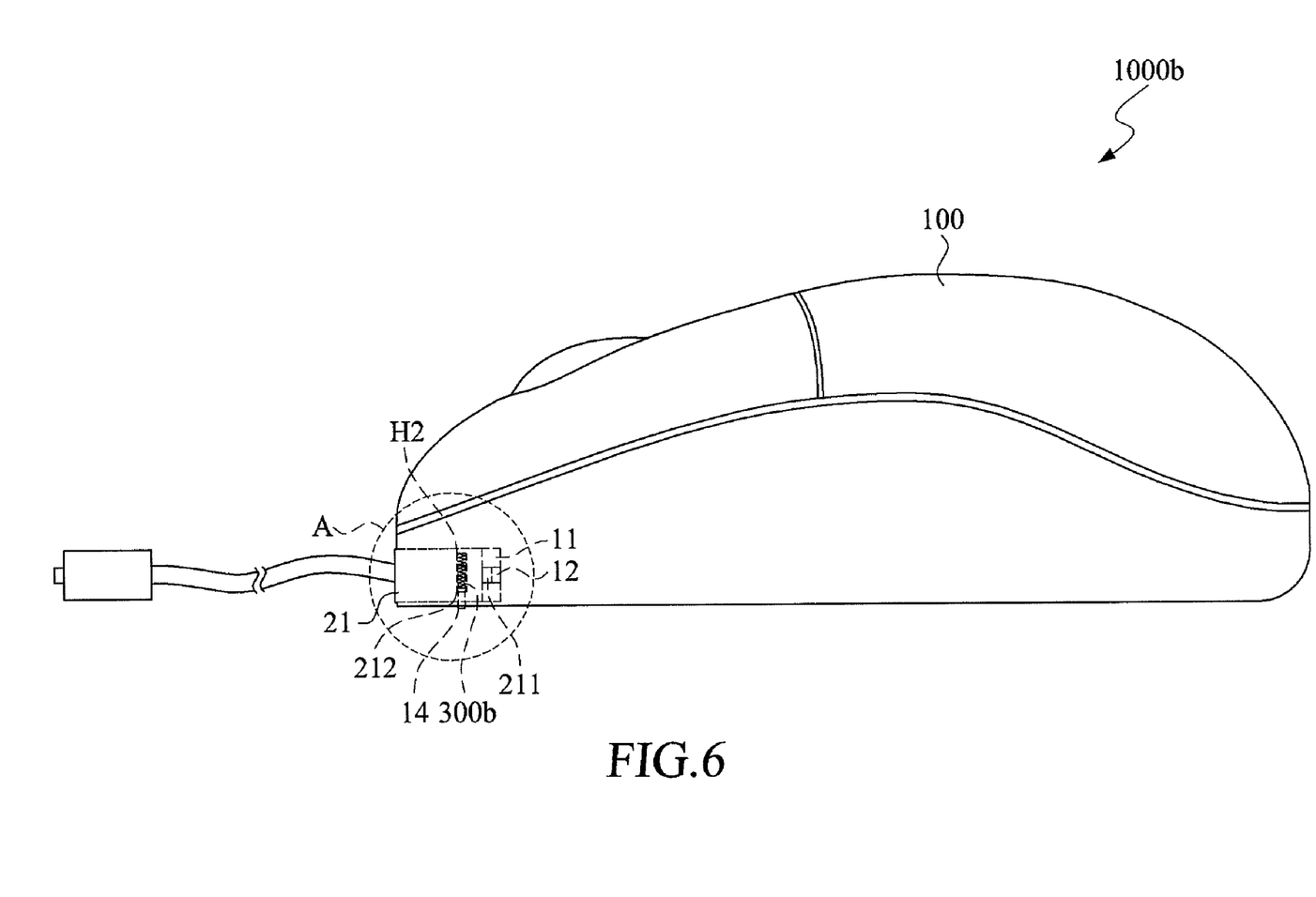
FIG. 6 shows an engagement state of a third embodiment of the mouse device in accordance with the present invention.
Figure 7:
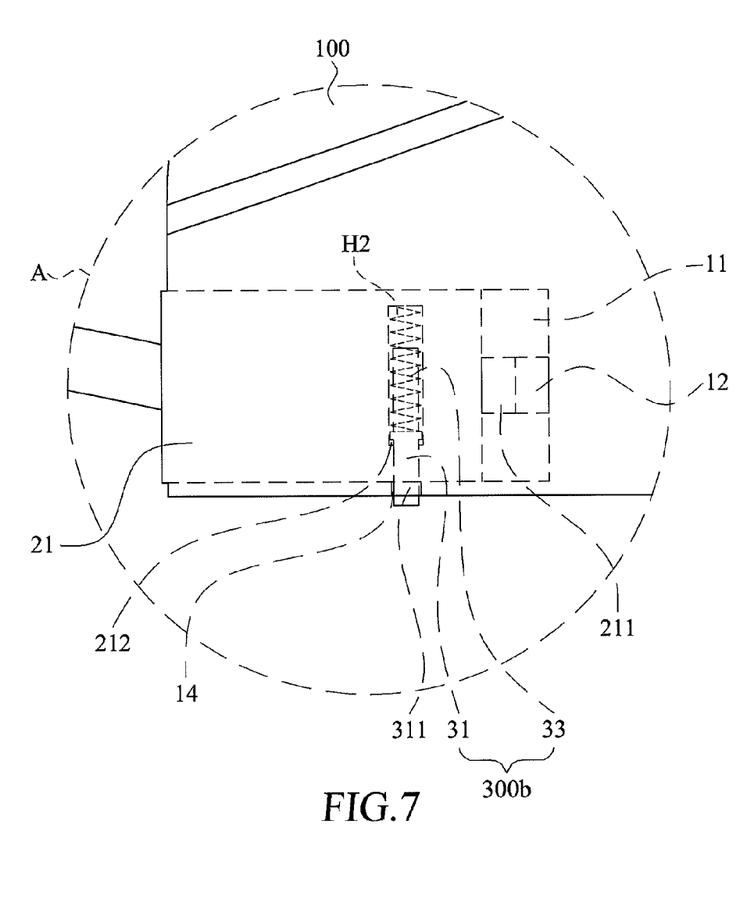
FIG. 7 shows the buckling means of FIG. 6.

Referring now to FIG. 6 and FIG. 7, an engagement state of a third embodiment of the mouse device in accordance with the present invention and a buckling means of the third embodiment are shown, respectively. In this embodiment 1000b, the first terminal 21 has an internal accommodation space H2 and the first connection port 211 is located at one side of the accommodation space H2. The first terminal 21 further has a first opening 212 located at another side of the accommodation space H2 perpendicular to the side where the first connection port 211 locates. The buckling means 300b includes a stop rod 31 and a spring element 33. The stop rod 31 located mainly inside the accommodation space H2 has a stop end 311 penetrating through the first opening 212. The spring element 33 sleeves the stop rod 31 inside the accommodation space H2. The mouse body 100 further includes a buckling hole 14 located close to a bottom plate of the accommodation space 100. In the case that the first terminal 21 is buckled inside the buckling jack 11 of the mouse body 100, the stop end 311 of the stop rod 31 is plugged inside the buckling hole 14 of the bottom plate of the mouse body 100. While in disengaging the transmission cable 200 from the mouse body 100, the stop rod 31 can be driven inward to leave off the buckling hole 14 by depressing the stop end 311 of the stop rod 31, such that the transmission cable 200 can be easily pulled off the buckling jack 11 of the mouse body 100.

By providing the aforesaid buckling means 300, 300a or 300b respectively to the mouse device 1000, 1000a or 1000b in accordance with the present invention, change of a separable transmission cable 200 with a proper application length can be arbitrarily and easily. Thereby, the operation precision of the mouse device can be waived from the location of the connected computer and thus be ensured. Also, too-short, too-long and replacement problems in transmission cable 200 can be easily overcome.

While the present invention has been particularly shown and described with reference to a preferred embodiment, it will be understood by those skilled in the art that various changes in form and detail may be without departing from the spirit and scope of the present invention.

We claim:

1. A mouse device with a separable transmission cable, comprising:

a mouse body, further having a buckling jack and a body connection port located close to the buckling jack, the buckling jack having at least an opening;

a transmission cable, further comprising a first terminal and a second terminal, the first terminal having a first connection port for engaging the body connection port, the second terminal having a second connection port for engaging a computer; and a buckling means, located at the first connection port for buckling the first terminal inside the buckling jack of the mouse body;

wherein said first terminal has an internal accommodation space, said first connection port being located at one side of the accommodation space, said first terminal further having a first opening at another side of the accommodation space, and a second opening at a further side of the accommodation space, said buckling means further including a stop rod, a push rod and two spring elements, the stop rod having a stop end penetrating through the first opening and a first taper end located opposing to the stop end, one of the two spring elements sleeving the stop rod inside the accommodation space, the push rod having a second taper end to contact with the first taper end of the stop rod and a push end penetrating the second opening, another of the two spring elements sleeving the push rod inside the accommodation space.

2. The mouse device according to claim 1, wherein said mouse body further has a cover protrusion located at said opening, the cover protrusion shielding said opening of said buckling jack while said transmission cable is disengaged from said mouse body.

3. The mouse device according to claim 1, wherein said buckling means includes a connection part, a stop part and a depression part, the connection part being to connect with said first terminal, the stop part being protruded laterally from the connection part in a manner of toward said second terminal, the depression part being protruded from a rear of the stop part in a manner of toward said second terminal, the stop part being contacted against an inner wall of said buckling jack and the depression part being located outside said mouse body while said first terminal is buckled inside said buckling jack of said mouse body.

4. The mouse device according to claim 1, wherein said first terminal has an internal accommodation space and said first connection port is located at one side of the accommodation space, said first terminal further having a first opening located at another side of the accommodation space opposing to said first connection port, said buckling means further including a stop rod and a spring element, the stop rod located mainly inside the accommodation space and having a stop end penetrating through said first opening, the spring element sleeving the stop rod inside the accommodation space, said mouse body further including a buckling hole located close to a bottom plate of the accommodation space, the stop end of the stop rod being plugged inside the buckling hole of the bottom plate while said first terminal is buckled inside said buckling jack.

* * * * *